United States Patent
Vince, II et al.

(10) Patent No.: US 6,758,057 B2
(45) Date of Patent: Jul. 6, 2004

(54) BIMODAL REFRIGERATION SYSTEM AND METHOD

(76) Inventors: Gerard C. Vince, II, 353 Parsonage Rd., Edison, NJ (US) 08816; Prakash W. Shahani, 10 Old Mine Rd., Lebanon, NJ (US) 08833; Paul V. Robbins, 1505 Dennis St., Jacksonville, FL (US) 32204

( * ) Notice: Subject to any disclaimer, the term of this patent is extended or adjusted under 35 U.S.C. 154(b) by 0 days.

(21) Appl. No.: 10/409,351

(22) Filed: Apr. 8, 2003

(65) Prior Publication Data

US 2004/0020236 A1 Feb. 5, 2004

Related U.S. Application Data

(60) Provisional application No. 60/399,525, filed on Jul. 30, 2002.

(51) Int. Cl.$^7$ .......................... B60H 1/32; F25B 25/00; F25D 17/02
(52) U.S. Cl. ................ 62/434; 62/332; 62/239
(58) Field of Search .......................... 62/434, 332, 239, 62/430, 408, 89, 457.9; 454/137

(56) References Cited

U.S. PATENT DOCUMENTS 4,459,821 A   7/1984   Cabell et al.
4,726,196 A   2/1988   Zajic
4,969,509 A   11/1990  Merensky
4,979,431 A   12/1990  Fujimoto et al.
5,809,798 A   9/1998   Clarke et al.
5,830,057 A   11/1998  Hunt, Jr.
5,870,897 A   2/1999   Barr et al.
5,950,450 A   9/1999   Meyer et al.

*Primary Examiner*—Chen Wen Jiang
(74) *Attorney, Agent, or Firm*—Thomas C. Saitta

(57) ABSTRACT

A bimodal refrigeration system for use in refrigerated transport containers or refrigerated warehouses. The present invention includes a refrigerated container having an enclosed cargo chamber for storing refrigerated goods and a mechanical refrigeration unit that produces a chilled forced-air current within the cargo chamber. The cargo chamber is designed to guide the forced-air current in a specified discharge and return path. In accordance with the present invention, a row of thermal storage ducts for retaining endothermic storage material are disposed within the cargo chamber. The thermal storage ducts are longitudinally disposed in parallel with the air flow direction of the specified forced-air discharge and return path to enable maximum convective thermal exchange between the forced-air current and the endothermic storage material without obstructing the specified forced-air discharge and return path.

33 Claims, 7 Drawing Sheets

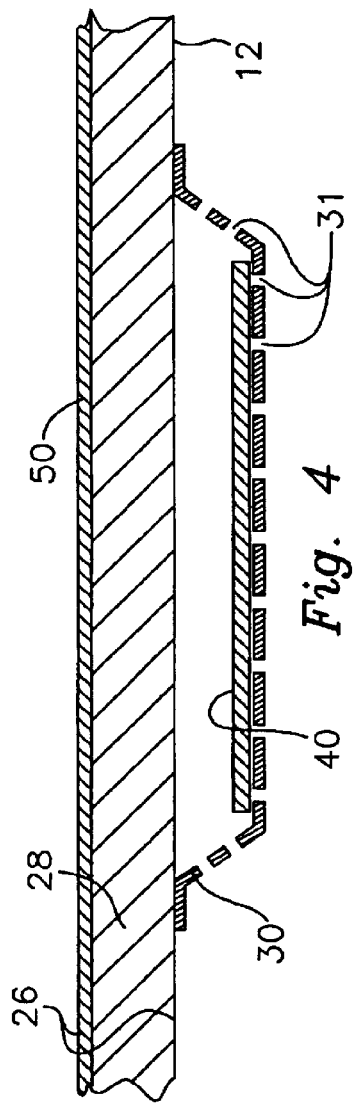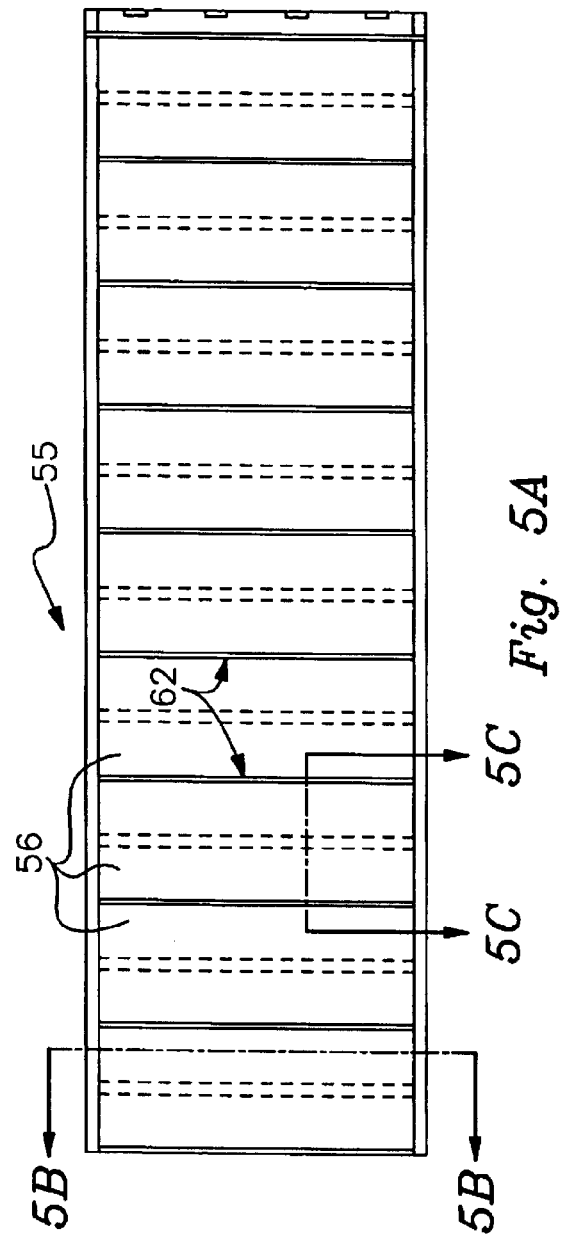

BIMODAL REFRIGERATION SYSTEM AND METHOD

CROSS REFERENCE TO RELATED APPLICATIONS

This application is a continuation of and claims priority from U.S. provisional patent application serial No. 60/399,525 filed on Jul. 30, 2002, the contents of which are incorporated herein by reference.

BACKGROUND OF THE INVENTION

1. Technical Field

The present invention relates generally to refrigeration systems, and in particular to refrigerated containers or enclosures that employ mechanical refrigeration systems to maintain goods at a desired temperature during transport or storage. More particularly, the present invention relates to an improved system and method employing endothermic storage material in conjunction with forced air mechanical refrigeration to provide a more efficient refrigerated storage containment unit.

2. Description of the Related Art

Transportable cargo containers are well known in the shipping industry and typically comprise generally rectangular containers adapted to be placed onto wheeled chassis, railroad cars, ocean-going ships, etc., or are manufactured as an integral wheeled trailer or railroad car. Many goods and foodstuffs require refrigeration during transport to prevent spoilage or degradation, and it is well known to provide cargo containers with cooling and thermal insulation systems in order to maintain the cargo within a desired temperature range. Polyurethane foam is typically installed as solid sheets or as an injected foam within the containment walls of refrigerated cargo containers to form a thermal insulation barrier against outside ambient temperatures. The selection of a heat extraction system for conventional refrigerated cargo containers is made in accordance with temperature control and thermal efficiency characteristics that are best suited for a particular cargo type, and furthermore, in accordance with transport and delivery logistics.

For long distance transport and delivery in which a minimum number of intermediate loading and unloading stops are made in transit, cooling is often provided by blowing or injecting crushed ice or other endothermic substances, including toxic or otherwise hazardous chemicals such as liquid nitrogen or frozen carbon dioxide crystals, into the cargo container. These so-called "closed door" cooling systems are well-suited for relatively uninterrupted end-to-end long distance deliveries, and are highly efficient in terms of electricity and fuel consumption required to maintain the cargo below a given temperature. However, the sharp thermal gradients resulting from injecting the refrigerant directly into the cargo space in a solid, liquid or gaseous state, results in damage to sensitive cargos such as produce and refrigerated medications. Furthermore, the direct contact between the refrigerant and moisture-laden cargo results in excessive condensation of water vapor which freezes around the refrigerant, thus forming ice sheets that pose convenience and safety problems when accessing the cargo container, and also significantly reduce the thermal exchange efficiency between the refrigerant and the cargo chamber. The need to maintain a controlled, low humidity atmosphere within the cargo chamber makes injected refrigerant techniques unsuitable for so-called "open-door" transport in which refrigerated or frozen goods are delivered from a centralized source such as a warehouse to several dispersed retail destinations.

Many of the problems associated with the foregoing transport refrigeration techniques are addressed by mechanical refrigeration systems, which have consequently come into widespread use. Mechanical refrigeration systems used for transport employ a conventional evaporator/condenser thermal exchange mechanism that operates in accordance with many of the same refrigeration principles used in household refrigerators and freezers. The mechanical refrigeration system is typically attached onto one end of a refrigerated transport container, commonly referred to in the art as a "reefer," and includes a blower to produce a forced-air cooling effect within the container, inducing a convective mode of heat transfer required for quickly restoring and maintaining the prescribed cargo temperature in an open door transport context.

Compared with other transport refrigeration techniques, mechanical refrigeration results in minimal ice build-up in the cargo chamber and furthermore provides a more stable temperature control mechanism than that provided by injected refrigerant systems which are better suited for very low temperature storage. However, the compressors utilized in conventional mechanical refrigeration systems consume considerable electrical power that must be generated on-board for transportable cargo applications. Furthermore, the convective, forced-air thermal exchange mechanism, in which cold air is blown over the refrigerated cargo, inevitably results in an uneven temperature distribution and abrupt thermal gradients within the refrigerated container and its cargo. In marine transport environments, utilization of mechanically refrigerated containers presents logistical problems relating to restrictions as to where the containers can be placed onboard the ship. Specifically, the air exhaust requirements of refrigerator condenser fans restricts the loading and placement of mechanically refrigerated containers to above-deck locations where the warm condenser exhaust is freely released into the open atmosphere without negatively impacting other nearby refrigerated containers. This locatability restriction naturally results in a competitive scarcity of available above-deck storage space, significantly increasing shipping costs for reefers. In addition to the foregoing problems relating to energy consumption, uneven thermal gradients, and shipping costs, the continuous cycling of mechanical refrigeration systems results in significant maintenance costs incurred in repairing and replacing worn or depleted refrigeration system components and related power generating components.

It can therefore be appreciated that a need exists for an improved cargo refrigeration system and method of implementing the same that address the foregoing problems associated with the conventional injected chemical refrigerant and mechanical forced-air cooling systems. The present invention addresses such a need.

SUMMARY OF THE INVENTION

A bimodal refrigeration system is disclosed herein. The present invention includes a refrigerated container having an enclosed cargo chamber for storing refrigerated goods and a mechanical refrigeration unit that produces a chilled forced-air circulation within the cargo chamber. The cargo chamber is designed to guide the forced-air in a specified discharge and return path. In accordance with the present invention, a row of thermal storage ducts for retaining endothermic storage material are disposed within the cargo chamber. The thermal storage ducts are longitudinally disposed in parallel with the air flow direction of the specified forced-air discharge and return path to enable maximum convective thermal exchange between the forced-air current and the endothermic storage material without obstructing the specified forced-air discharge and return path.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a more detailed front or rear cross section profile view of a thermal storage duct as deployed within a refrigerated container in accordance with the present invention;

FIGS. 5A–5C illustrate various cross section views of an improved thermal insulation apparatus in accordance with one embodiment of the present invention.

DETAILED DESCRIPTION OF A PREFERRED EMBODIMENT

Figure 1:
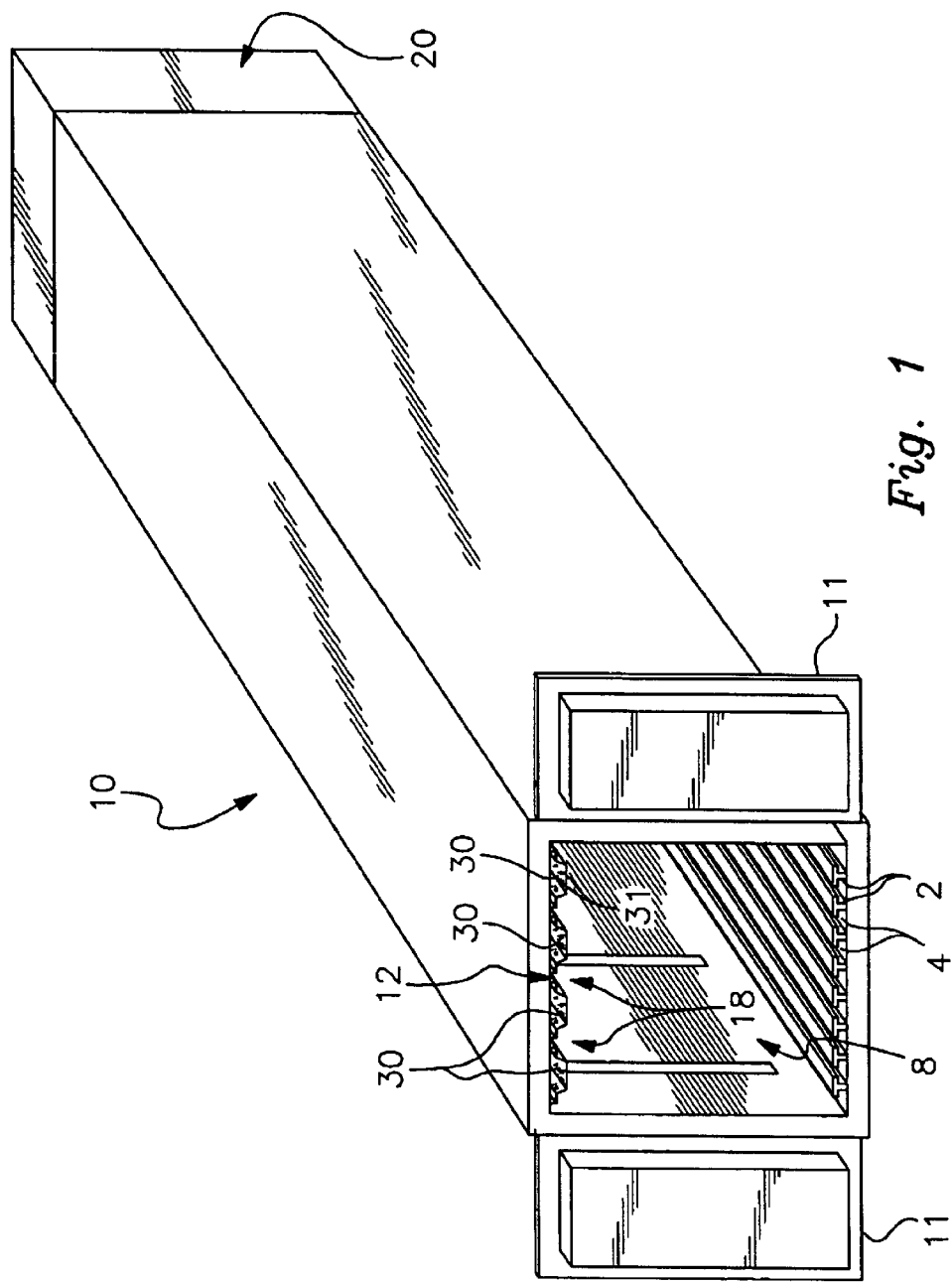
FIG. 1 is a perspective view depicting an improved bimodal refrigeration system in accordance with a preferred embodiment of the present invention.

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. In particular, although described primarily in relation to transportable containers, the present invention is applicable in alternate embodiments to stationary cold storage rooms or buildings.

The bimodal refrigeration system of the present invention employs an endothermic storage material within a refrigerated container in a manner that leverages the features of conventional mechanical refrigeration units, particularly mechanical refrigeration units employing forced-air chilling. In conjunction with the "active" heat exchange mode provided by the forced-air mechanical refrigeration unit, the bimodal refrigeration system advantageously employs a "passive" heat exchange mode in the form of an endothermic storage apparatus compatibly deployed within a refrigerated container. As utilized herein, a "bimodal" refrigeration system refers to a heat extraction/absorption system employing a passive heat exchange mechanism in the form of an endothermic storage material in conjunction with an active heat exchange mechanism in the form of a forced-air mechanical refrigeration unit. The bimodal refrigeration system efficiently addresses problems and costs associated with conventional refrigerated cargo systems including uneven cooling of temperature sensitive cargo and ice buildup resulting from excessive condensation within the cargo chamber. Furthermore, the bimodal cooling mechanism of the present invention reduces the required active operating time and excessive cycling of the resident mechanical refrigeration unit. Such reduction of active cycling of the mechanical refrigeration unit consequently reduces the overall energy supply requirements such as provided by diesel generators and the like, and also reduces repair and maintenance costs of the mechanical refrigeration unit.

As explained in further detail with reference to the figures, the present invention is implemented within a refrigerated container having a conventional forced-air mechanical refrigeration unit that produces and directs chilled air into the interior of the container or room as required to lower and then maintain the temperature within the container or room at or below a predetermined temperature. Thermal storage ducts having a number of air flow apertures are fixedly coupled to the ceiling of the refrigerated container, wherein a thermally chargeable material having a suitable phase change or stasis temperature, and preferably contained within discrete sealed packets, is evenly distributed in a suspended manner above the cargo chamber interior of the refrigerated container.

In accordance with one embodiment, the chilled, forced-air current is discharged into the interior cargo chamber of a refrigerated container. The cargo chamber includes air flow guide means for directing the chilled, forced-air current in a specified discharge and return path from a forced-air outtake of the mechanical refrigeration unit around the top, backside, and bottom of a refrigerated cargo load and back to a return port. In this manner, the specified discharge and return path is composed of one or more parallel air flow loops around the top, backside, and bottom sides of a cargo load resting on the floor of the cargo chamber. In accordance with the present invention, a row of two or more thermal storage ducts are disposed in parallel rows along the longitudinal extent of the refrigerated container's ceiling in parallel with the direction of the specified discharge and return forced airflow path. In this manner, a substantial volume of the chilled, forced airflow is funneled between the multiple open channels between adjacent storage ducts to promote maximum convective thermal exchange between the forced-air current and a chargeable endothermic storage material retained within the thermal storage ducts. Furthermore, the parallel, longitudinally disposed storage duct rows enable a comprehensive and uniform distribution of endothermic storage material over the cargo load to maintain the thermal integrity of the load without unduly obstructing the discharge or return air flow path.

When in active mode, the chilled airflow from the mechanical refrigeration unit is used to bring the endothermic storage material to the required phase change or stasis temperature. In passive mode, enabled when the endothermic storage material has reached its stasis temperature, the mechanical refrigeration system deactivates and the activated storage material serves as a suspended, non-mechanically driven heat sink for a passive thermal convection mechanism wherein a passive convective air current resulting from so-called natural thermal circulation is baffled through the duct apertures to promote an even thermal distribution throughout the cargo chamber. The presence of this passive heat sink and natural convective flow maintains the reduced internal temperature of the container or room for an extended period of time. The predictability of the passive mode periods enables thermal recharge cycling of the mechanical refrigeration unit to be synchronized with "off-peak" hours when the cost of electricity is lower than during peak demand hours.

The system as described is also useful in reducing or precluding excessive moisture within the container or room, which can be a significant problem. In systems relying solely on mechanical refrigeration units, excess moisture during the pre-cooling loading cycle results in the build-up of ice on the cooling coils, requiring the unit to be reversed in a defrost cycle wherein the coils are defrosted. This need for defrosting may occur multiple times during the chilling process, resulting in a thermal and energy inefficient process. By chilling the endothermic storage material and the container or room prior to introduction of the goods, moisture loss from the goods during initial cooldown is suppressed and the coil freezing problem is obviated.

In a preferred embodiment, the refrigerated container is provided with additional insulating elements to reduce outside heat infiltration into the interior of the container or room from UV, radiant, heat and convection. The exterior of the container is preferably coated with a thermal reflective coating to reduce heat absorption from UV radiation. As explained with reference to FIGS. 5A–5C and FIGS. 6A–6C, panels with high insulation values are disposed on the interior of the container to achieve optimum thermal storage efficiency.

With reference now to the figures, wherein like reference numerals refer to like and corresponding parts throughout, and in particular with reference to FIG. 1, there is depicted a perspective view showing a bimodal refrigeration system in accordance with a preferred embodiment of the present invention. Specifically, FIG. 1 illustrates a refrigerated container 10 which is a generally rectangular structure having a set of cargo doors 11 on a backside end and a mechanical refrigeration unit 20 mounted on the frontside end, and may be structurally adapted to be mountable onto a wheeled chassis for intermodal truck transport. To minimize thermal ingress from warmer outside temperatures, refrigerated container 10 includes insulated walls, floors and ceilings. The bimodal refrigeration system illustrated in FIG. 1 includes, as one of its thermal control modalities, a thermostatically controlled mechanical refrigeration unit 20 that monitors and regulates the temperature within an interior cargo chamber 8 and the refrigerated cargo stored therein. To this end, mechanical refrigeration unit 20 employs a conventional evaporator/condenser system that produces chilled air and furthermore includes blowers or fans (not depicted) to forcefully discharge the chilled air into an interior cargo chamber 8 to achieve rapid temperature control or recovery. Such mechanical refrigeration systems are well known and widely utilized to store and maintain goods in transit that at reduced temperatures, such as between 32 to 55 degrees F. for fruit, vegetables, beer, dairy products, pharmaceuticals, and the like, or between minus 20 and 32 degrees F. for frozen meat, ice cream, and the like.

The other thermal control modality employed by refrigerated container 10 is achieved by compatibly deploying an endothermic storage material, such as an endothermic gel material or a phase change material, in conjunction with the cycling, forced-air heat extraction mechanism to acheive substantially increased thermal extraction and absorption capacity, a more even thermal gradient distribution, and a reduced cycling of mechanical refrigeration unit 20. In accordance with the present invention, the endothermic storage material is advantageously deployed within each of a row of thermal storage ducts 30, which as depicted in FIG. 1, are longitudinally extended along the interior ceiling 12 of cargo chamber 8.

Preferably, thermal storage ducts 30 extend longitudinally in a straight, parallel path from the front to the back end of cargo chamber 8, but other arrangements are possible. For example, and in an alternative embodiment, thermal storage ducts 30 extend longitudinally in a slightly curved or slanted manner that facilitates smooth and unobstructed air flow between the front and rear ceiling of cargo chamber 8. To accommodate alternate forced airflow paths, thermal storage ducts 30 may also be mounted on the walls or the floor of refrigerated container 10. Thermal storage ducts 30 may be constructed of any suitable material, such as a sheet metal or plastic, but are preferably made of a suitably heat conductive and non-corrosive metal or alloys.

Thermal storage ducts 30 are in fluid communication with the discharge or fan unit or units (not depicted) of mechanical refrigeration unit 20, such that a primary forced-air flowpath within cargo chamber 8 is directed into rows of longitudinal channels 18 formed between the storage duct rows. In accordance with a preferred embodiment, thermal storage ducts 30 are provided with a number of flow apertures 31 through which a sub-volume of the forced-air current flowing guided by channels 18 passes into the interior of thermal storage ducts 30. Flow apertures 31 may consist of holes or slots or any other suitable aperture shape or contour suitable for enabling air flow from cargo chamber 8 to enter the storage ducts.

Figure 2:
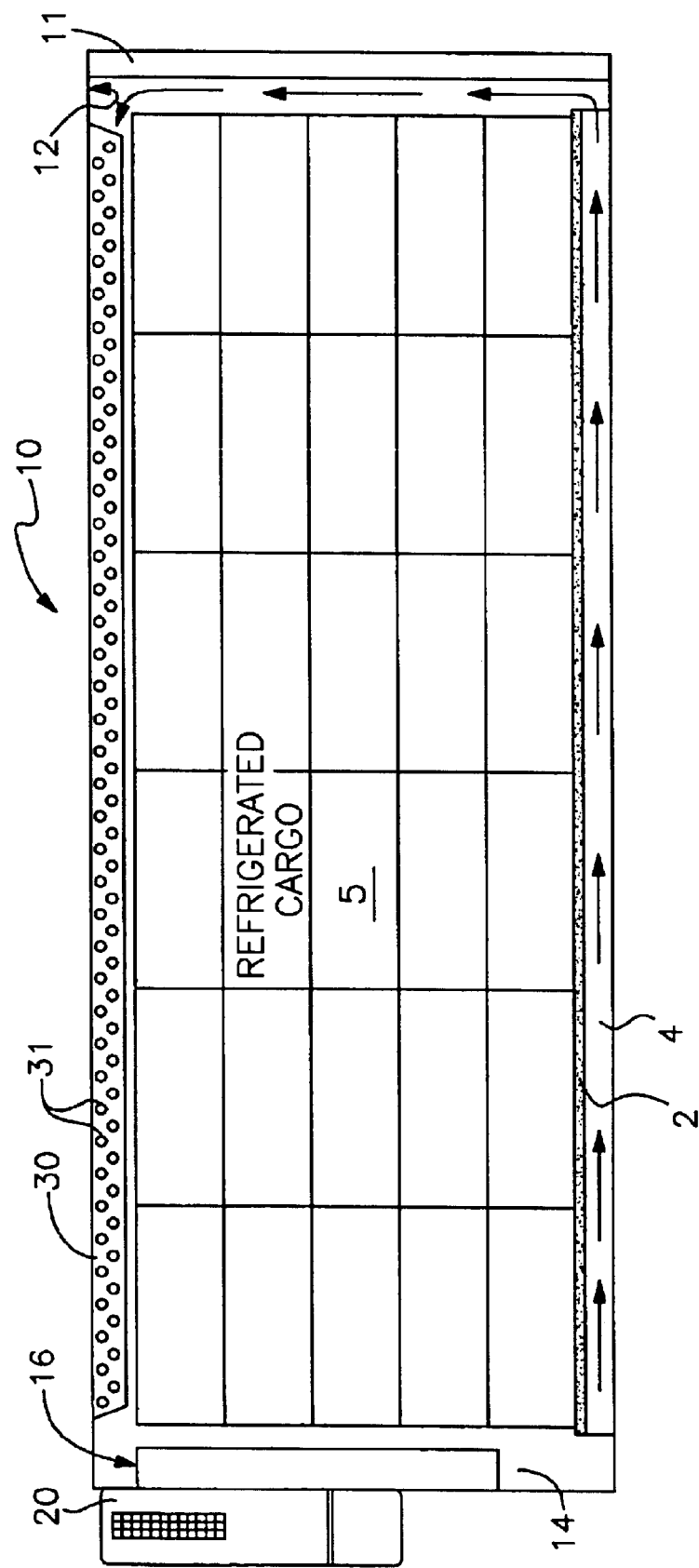
FIG. 2 illustrates a side profile view of a refrigerated container cargo chamber as designed and implemented within the bimodal refrigeration system of the present is invention.
Figure 3:
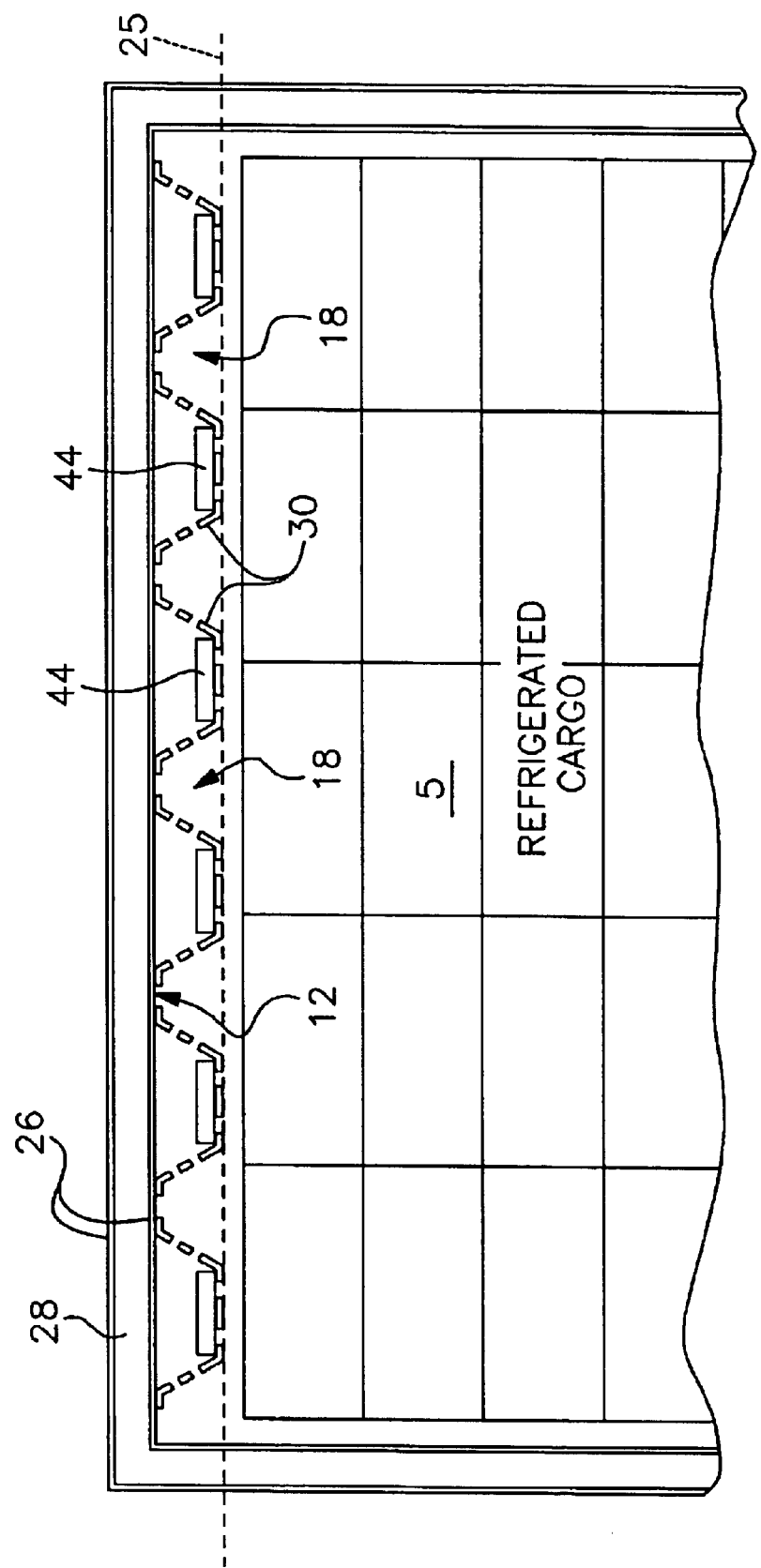
FIG. 3 is a partial cross section profile view depicting the mutual disposition of multiple thermal storage ducts as arranged on the ceiling of a refrigerated container in accordance with a preferred embodiment of the present invention.

FIGS. 2 and 3 depict a side profile view and a lateral cross section view, respectively, of the interior of refrigerated container 10 illustrating the means for directing the forced airflow and the manner in which the bimodal refrigeration system of the present invention leverages these means to provide a maximally efficient thermal transfer mechanism between the mechanical refrigeration unit and the endothermic storage material while not obstructing the necessary discharge and return airflow path. As shown in FIG. 2, cargo doors 11 are closed to form an enclosed, substantially rectangular cargo chamber interior in which a refrigerated cargo 5 has been loaded. In the depicted embodiment, refrigerated container 10 employs a so-called "bottom flow" forced-air circulation system in which a chilled forced-air current is blown from mechanical refrigeration unit 20 from a discharge vent or port 14 at the front, lower side of the enclosed cargo chamber. The forced-air current flows into a set of floor channels 4 (see FIG. 1) formed between T-rails 2 on the floor of the cargo chamber, from which the air current is guided toward the backside cargo chamber wall comprising closed cargo doors 11. Bounded between refrigerated cargo 5 and cargo doors 11, the forced airflow current flows upward to the cargo chamber ceiling 12, and from there is guided between refrigerated cargo 5 and ceiling 12 in a return flow path to a return vent or port 16 on the frontside wall of the cargo chamber. In this manner, the depicted arrangement and mutual disposition of discharge and return ports 14 and 16, floor channels 4, backside cargo doors 11 and ceiling 12 combine to form a forced-air guide means for guiding the forced-air current in a specified discharge and return path depicted by the arrows and direction indicators in FIG. 2.

In addition to maintaining a prescribed temperature, it is important to maintain a specified airflow current within a cargo chamber for heat transfer and atmospheric conditioning reasons. Establishing a specified forced airflow in terms of velocity and direction is critical in maintaining an effective convective ambient thermal exchange between the inner walls and ceiling of the cargo chamber and the chilled air current, and similarly, for maintaining convective thermal exchange between the cargo and the chilled air. The directed airflow is also required for maintaining adequate recirculation and replacement of the interior cargo chamber atmosphere to remove excess humidity or contaminants that may damage sensitive cargos.

It should be noted that although a bottom flow circulation system is depicted herein, a "top flow" circulation system wherein the flow path is reversed from that shown in FIG. 2 may also be employed by the bimodal refrigeration system without departing from the spirit or scope of the present invention. The modifications necessary to implement the bimodal refrigeration system as described herein with a top-flow circulation system will be readily apparent to those skilled in the art.

In use, refrigerated container 10 is loaded with refrigerated cargo 5 to be stored and transported, cargo doors 11 are closed, and mechanical refrigeration unit 20 is activated to extract heat and drive the temperature within refrigerated container 10 to the prescribed storage temperature or thermostatically regulated temperature range. A substantial portion of the forced-air current actuated by mechanical refrigeration unit 20 is guided in the aforementioned manner underneath and behind refrigerated cargo 5 and returns to a common return path over cargo 5 along cargo chamber ceiling 12. As illustrated in FIGS. 2 and 3, the row of thermal storage ducts 30 are longitudinally disposed in a downwardly extending manner from cargo chamber ceiling 12 to form multiple, substantially unobstructed airflow channels 18 through which the forced-air current flows in its return path to return port 16. It should be noted that the longitudinal, row-wise disposition of thermal storage ducts 30 shown in FIGS. 2 and 3 enables a comprehensive and even distribution of the endothermic storage material over substantially the entire ceiling area without blocking or disrupting the return airflow path, and furthermore provides a maximum convective thermal transfer surface area between the return airflow current and the exposed surface areas of thermal storage ducts 30. In addition, and as shown in FIG. 3, the unobstructed airflow path provided by channels 18 permits thermal storage ducts 30 to be extended downward to a level even with or above a maximum load height limit 25, which specifies the maximum level at which refrigerated cargo 5 can be stacked without obstructing the return air flow path. In this manner, the bimodal refrigeration system of the present invention enables maximum loading of the cargo chamber as limited by specified height limit 25 without obstructing the return airflow path.

The chilled, forced-air current actuated by mechanical refrigeration unit 20 is guided between thermal storage ducts 30 and through apertures 31 enabling conductive and/or convective thermal transfer between the air current and an endothermic storage material 44 retained within thermal storage ducts 30. Mechanical refrigeration unit 20 operates in its active chill mode until the prescribed cargo chamber temperature is achieved and thereafter is cycled on and off either manually or by automated temperature regulation means such as a thermostat, wherein the prescribed temperature corresponds approximately to the phase change or stasis temperature of endothermic storage material 44. After the forced-air cooling has effectuated a stasis or phase change condition in endothermic storage material 44, mechanical refrigeration unit 20 is switched off manually or automatically in response to either the lapse of a predetermined "pull-down" period or as determined by an automatic temperature sensing and regulation device. Once endothermic storage material 44 has been thermally charged, as by reaching its stasis or phase change temperature, the endothermic (i.e. heat absorbing) characteristics of the storage material significantly extends the period of time over which the internal temperature of the cargo chamber 8 will remain at or below the predetermined maximum temperature without having to reactivate mechanical refrigeration unit 20. The particular endothermic storage material chosen is dependent on the desired temperature to be maintained within refrigerated container 10. For example, an endothermic gel that reaches stasis at approximately minus 10 degrees F. is suitable for use in circumstances where the goods are to be maintained at or below freezing. For goods that must be chilled but not frozen, gels having a higher stasis temperature will be utilized.

In a preferred embodiment, refrigerated container 10 is pre-chilled to bring endothermic storage material 44 to stasis prior to loading refrigerated cargo 5. This creates a cold shock wave that significantly reduces moisture loss from the cargo goods as they are being loaded. The presence of excessive moisture is a major problem in that the moisture collects and freezes on the cooling coils of the mechanical refrigeration units 20. When this occurs, refrigeration unit 20 must be reversed in a defrost cycle to melt the moisture from the coils. This defrosting cycle may occur multiple times in conventional systems, thus reducing the efficiency of the system. By bringing endothermic storage material 44 to stasis prior to loading the goods, this coil freezing problem is obviated.

Additionally, the comprehensive, uniform distribution of endothermic storage material 44 across cargo chamber ceiling 12 reduces localized temperature variations within the cargo chamber. Without the bimodal refrigeration system as described herein, localized temperature variations within the cargo chamber result from orientation of the container to the sun, distribution of the goods within the container, and location of the goods relative to the chilled air ingress. The disposition of endothermic storage material 44 within thermal storage ducts 30 as described facilitates a passive, natural convection mode wherein temperature gradients within refrigerated container 10 are significantly reduced.

Referring to FIG. 4, there is illustrated a more detailed lateral cross-sectional view of a thermal storage duct 30 as deployed within refrigerated container 10 in accordance with the present invention. As shown in FIG. 4, one or more gel packets 40 containing an endothermic storage material are disposed within thermal storage ducts 30. Gel packets 40 are be brought to stasis by maintaining the gel at a specified stasis temperature for sufficient period, typically several hours. Once activated or charged, the gel material within gel packets 40 remains active (i.e. in a phase change or stasis condition) for an extended period of time. As ambient heat infiltrates the sealed refrigerated container 10, this heat is selectively absorbed by the gel material rather than the goods, such that the temperature of the goods and the interior of refrigerated container 10 remains below a predetermined maximum temperature for longer period than if the gel was not present. Gel packets 40 are brought to stasis by the chilled air from mechanical refrigeration unit 20, the chilled air passing into flow apertures 31 and over and around gel packets 40 prior to being directed back out through flow apertures 31 into the interior of refrigerated container 10 and onto refrigerated cargo 5. This insures that gel packets 40 reach stasis within the shortest possible time. Representative of suitable gel packets 40 are the polypropylene derivative gels including Polyfoam U-TEK Model 420 gel packets, which attain stasis at minus 10 degrees F., Midland Chemical Polar Packs, and gel packets produced by Cryopak Industries of Canada, which have similar stasis levels. As further illustrated in FIG. 4, refrigerated container 10 is preferably includes an external reflective coating 50 having high UV reflective characteristics, typically a ceramic or polymer coating, such as a coating manufactured by ProTek-USA.

A key design feature of any refrigerated container is the structure and insulation materials utilized in the outer containment walls. The insulation presently utilized in the containment walls of refrigerated containers is a rigid polyurethane foam composite formed by injecting a self-expanding and self-curing, relatively high-density polyurethane foam into the interior cavity 28 (see FIGS. 3 and 4) between inner and outer metallic liners 26. Such sandwich composite polyurethane insulation provides thermal insulation to the inner cargo chamber as well as providing the structural adhesion between the outer and inner wall panels required to form a substantially rigid and robust composite suitable for mobile transport applications.

Figure 5B:
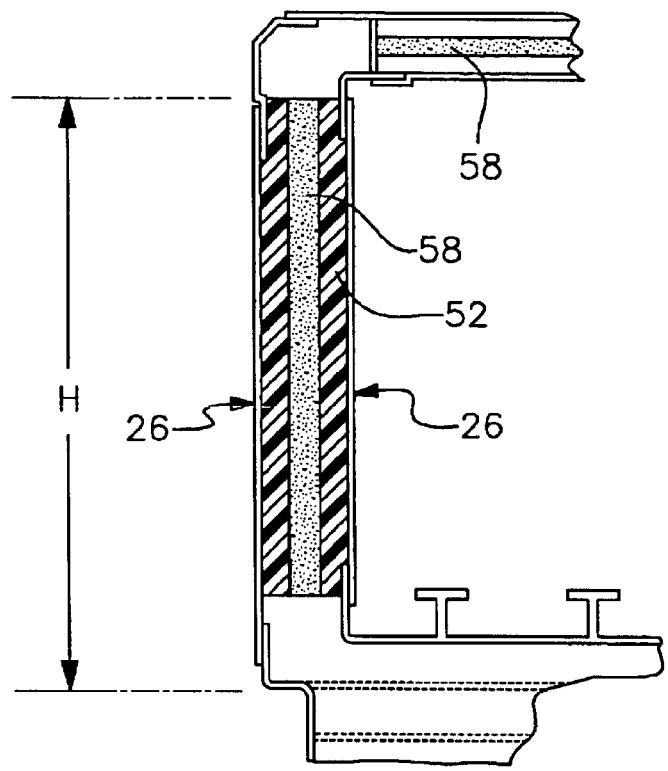
Figure 5C:
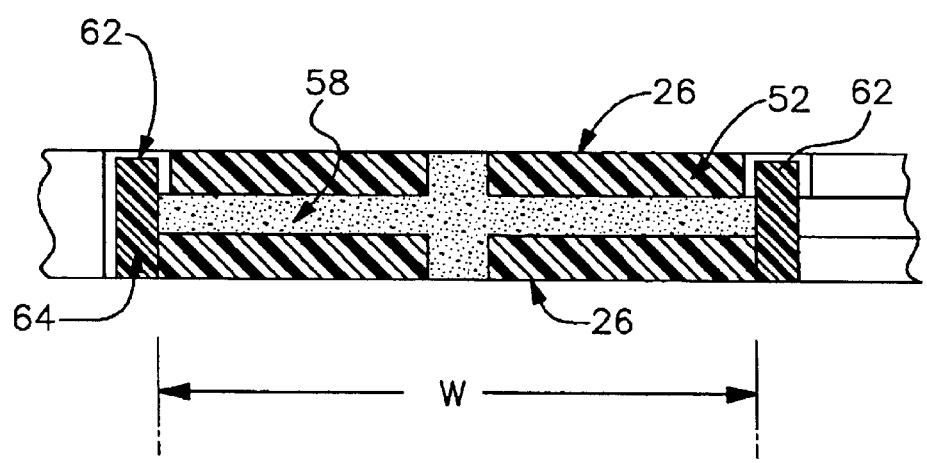

With reference now to FIGS. 5A–5C, there are illustrated a cut-away and two cross section views of an improved thermal insulation apparatus that may be utilized to insulate a refrigerated container in accordance with one embodiment of the present invention. Specifically, FIG. 5A is a cut-away view depicting multiple composite insulation panels 56 incorporated within a refrigerated container wall. As shown in the cross section views illustrated in FIGS. 5B and 5C, each of composite insulation panels 56 comprises inner and outer metal liners 26 forming a cavity in which a vacuum insulated panel (VIP) 58 is integrally incorporated within a rigid polyurethane foam substrate 52. Representative of suitable VIPs are those produced by Dow Chemical made with Instill AF, which encloses a barrier material Advantek 7400 and a desiccant supplied by Advantek, Inc. VIPs have characteristically high thermal resistance factors (R factors) and are thus significantly more effective in reducing thermal losses than polyurethane foam which has a much lower R factor. However, due to poor inherent structural support and vulnerability to thermal damage, VIPs have not been utilized for exterior wall insulation in conventional transport refrigerated containers.

The integral deployment of VIP 58 with the polyurethane foam 52 is achieved by initially bracing the cross member VIP 58 (see FIG. 5C) within the cavity bounded by metal liners 26 and a pair of stringers 62. The cross member bracing depicted in FIG. 5C provides sufficient structural support such that the pre-cured polyurethane can be injected into the cavity without buckling VIP 58. In this manner, composite panels 56 exhibit the superior thermal insulation characteristics of VIPs 58 in concert with the structural reinforcement and additional insulation performance provided by the injected polyurethane foam 52.

Figure 6A:
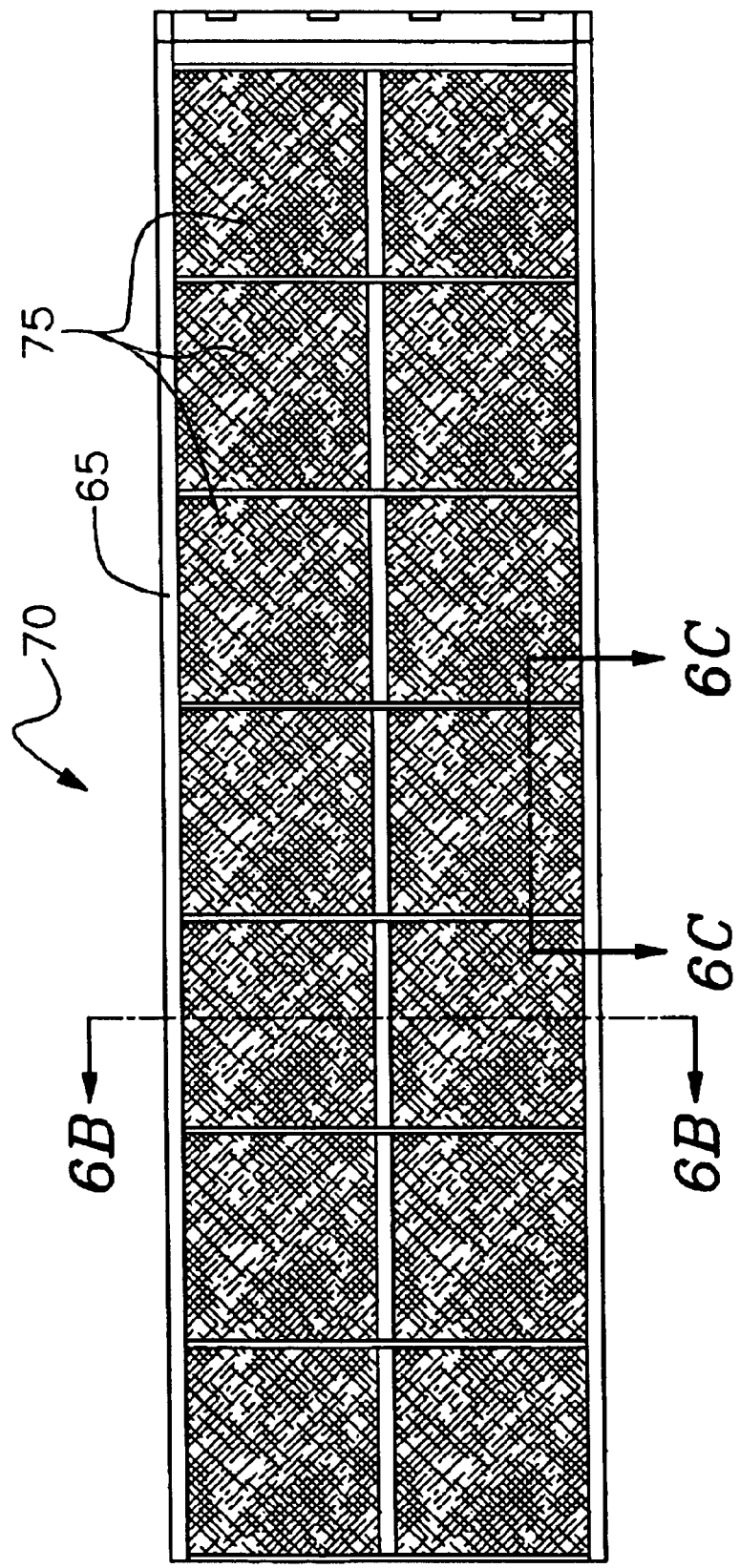
FIGS. 6A–6C depict various cross section views of an improved thermal insulation apparatus in accordance with an alternate embodiment of the present invention.
Figure 6B:
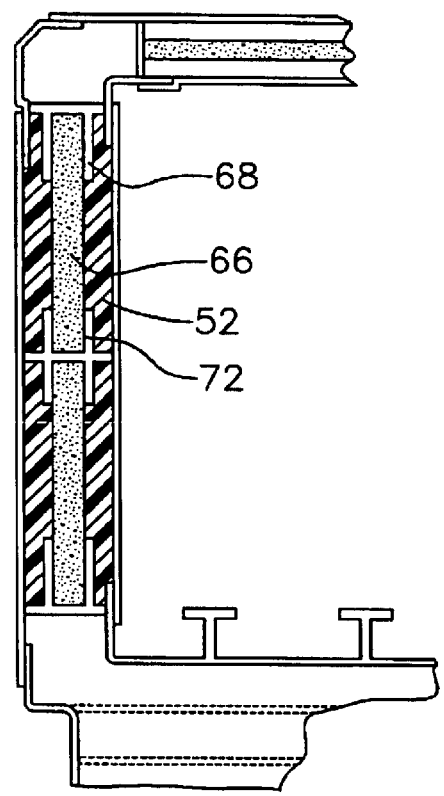
Figure 6C:
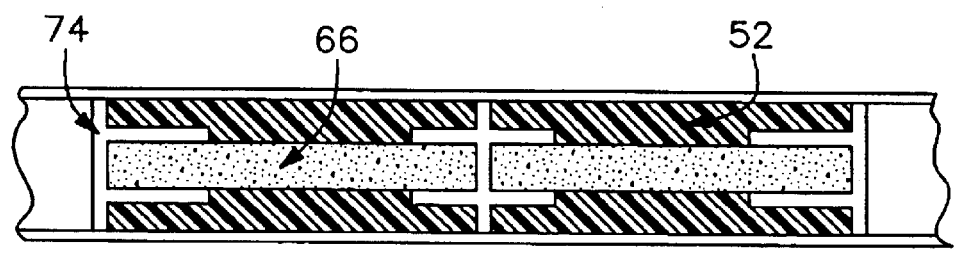

FIGS. 6A–6C illustrate an alternate technique for incorporating VIPs within a polyurethane composite container wall. Specifically, a cut-away view of a refrigerated container wall 70 is depicted as comprising a grid of composite panels 75, which similar to composite panels 56, comprise a polyurethane foam 52 integrally molded around VIPs 66. In accordance with the depicted embodiment, VIPs 66 are fixedly held in a grid pattern by a frame 65 prior to injecting the polyurethane foam 52 into the wall cavity. Frame 65 is preferably constructed of a heat resistant plastic or any other suitable lightweight framing material that is sufficiently heat resistant. As shown in FIGS. 6B and 6C, frame 65 preferably includes a series of U-shaped frame channels 68 and H-shaped frame channels 72. As with composite panels 56 shown in FIGS. 5A–5C, composite panels 75 exhibit the superior thermal insulation characteristics of VIPs 58 in concert with the structural reinforcement and additional insulation performance provided by the injected polyurethane foam 52.

While this invention has been described in terms of several embodiments, it is contemplated that alterations, permutations, and equivalents thereof will become apparent to one of ordinary skill in the art upon reading this specification in view of the drawings supplied herewith. It is therefore intended that the invention and any claims related thereto include all such alterations, permutations, and equivalents that are encompassed by the spirit and scope of this invention.

What is claimed is:

1. A bimodal refrigeration system comprising:
    a refrigerated container having an enclosed cargo chamber for storing refrigerated goods;
    a mechanical refrigeration unit that produces a chilled forced-air current within the cargo chamber, the cargo chamber designed to guide the forced-air current in a specified discharge and return path; and
    a plurality of thermal storage ducts for retaining endothermic storage material, wherein said plurality of thermal storage ducts are longitudinally disposed substantially in parallel with the air flow direction of the specified forced-air discharge and return path to enable maximum convective thermal exchange between the forced-air current and the endothermic storage material without obstructing the specified forced-air discharge and return path.

2. The bimodal refrigeration system of claim 1, wherein said plurality of thermal storage ducts are longitudinally disposed in a downwardly extending manner from the ceiling of the cargo chamber such that the forced-air current flows through a plurality of channels formed between adjacent of said plurality of thermal storage ducts.

3. The bimodal refrigeration system of claim 1, wherein the cargo chamber is further characterized in having a load height limitation that determines the maximum level at which cargo can be vertically stacked within the cargo chamber without obstructing the specified forced-air discharge and return path, and wherein said plurality of thermal storage ducts are further characterized as being fixedly attached to the ceiling of the cargo chamber and extending downwardly therefrom and terminating above or at the load height limitation.

4. The bimodal refrigeration system of claim 1, wherein each of said plurality of thermal storage ducts includes one or more apertures that enable the forced-air current to flow within the thermal storage ducts and over the endothermic storage material.

5. The bimodal refrigeration system of claim 1, wherein one or more of said thermal storage ducts includes an apertured bottom surface extending longitudinally in a parallel plane below the ceiling of said cargo chamber.

6. The bimodal refrigeration system of claim 1, wherein one or more of said thermal storage ducts comprises apertured lateral side surfaces extending downwardly from the cargo chamber ceiling.

7. The bimodal refrigeration system of claim 1, wherein said mechanical refrigeration unit includes a frontside discharge port for discharging the chilled forced-air current and a frontside return port for receiving the returned forced-air current.

8. The bimodal refrigeration system of claim 7, wherein a cargo load is stored on the floor of the cargo chamber, and wherein the specified discharge and return path includes one or more air flow loops from the discharge port to the return port through or around the cargo load.

9. The bimodal refrigeration system of claim 7, wherein the cargo chamber includes guide means for guiding the forced-air current along the specified discharge and return path.

10. The bimodal refrigeration system of claim 9, wherein the forced-air current is discharged from the discharge port at the front of the cargo chamber, said guide means including a set of floor channels within the floor of said cargo chamber.

11. The bimodal refrigeration system of claim 9, wherein the forced-air current is discharged from the discharge port at the front of the cargo chamber, said guide means including a backside wall.

12. The bimodal refrigeration system of claim 11, wherein the backside wall comprises a cargo door or pair of cargo doors.

13. The bimodal refrigeration system of claim 9, wherein said refrigerated container is a top flow refrigerated container such that the guide means comprise:
    a ceiling for guiding the forced-air current from the frontside discharge port toward a backside wall;
    the backside wall for guiding the forced-air current from the ceiling toward one or more floor channels; and
    the one or more floor channels for guiding the forced-air current from the backside wall toward the frontside return port.

14. The bimodal refrigeration system of claim 9, wherein said refrigerated container is a bottom flow refrigerated container such that the guide means comprise:

one or more floor channels for guiding the forced-air current from the frontside discharge port toward a backside wall;

the backside wall for guiding the forced-air current from the floor channels toward a ceiling; and the ceiling for guiding the forced-air current from the backside wall toward the frontside return port.

15. The bimodal refrigeration system of claim 1, further comprising an endothermic storage material fixedly retained within each of said plurality of thermal storage ducts.

16. The bimodal refrigeration system of claim 15, wherein said endothermic storage material is a thermally chargeable gel having endothermic and exothermic thermal exchange properties.

17. The bimodal refrigeration system of claim 15, wherein the endothermic storage material is a thermally chargeable phase change material.

18. An apparatus for deploying a passive cooling mechanism within a refrigerated cargo chamber in conjunction with a mechanical refrigeration unit that produces a chilled forced-air current within the cargo chamber, the cargo chamber designed to guide the forced-air current in a specified discharge and return path, said apparatus comprising:

a plurality of thermal storage ducts suspended in a downwardly extending manner from the ceiling of the cargo chamber for retaining endothermic storage material, said plurality of thermal storage ducts longitudinally disposed substantially in parallel with the air flow direction of the specified forced-air discharge and return path such that a plurality of air flow channels are formed between adjacent of said plurality of thermal storage ducts to enable maximum convective thermal exchange between the forced-air current and the endothermic storage material without obstructing the specified forced-air discharge and return path.

19. The apparatus of claim 18, wherein the cargo chamber is further characterized in having a load height limitation that determines the maximum level at which cargo can be vertically stacked within the cargo chamber without obstructing the specified forced-air discharge and return path, and wherein said plurality of thermal storage ducts are further characterized as being fixedly attached to the ceiling of the cargo chamber and extending downwardly therefrom and terminating above or at the load height limitation.

20. The apparatus of claim 18, wherein each of said plurality of thermal storage ducts includes one or more apertures that enable the forced-air current to flow within the thermal storage ducts and over the endothermic storage material.

21. The apparatus of claim 18, wherein one or more of said thermal storage ducts includes an apertured bottom surface extending longitudinally in a parallel plane below the ceiling of said cargo chamber.

22. The apparatus of claim 18, wherein one or more of said thermal storage ducts comprises apertured lateral side surfaces extending downwardly from the cargo chamber ceiling.

23. The apparatus of claim 18, wherein said mechanical refrigeration unit includes a frontside discharge port for discharging the chilled forced-air current and a frontside return port for receiving the returned forced-air current.

24. The apparatus of claim 23, wherein a cargo load is stored on the floor of the cargo chamber, and wherein the specified discharge and return path includes one or more air flow loops from the discharge port to the return port through or around the cargo load.

25. The apparatus of claim 23, wherein the cargo chamber includes guide means for guiding the forced-air current along the specified discharge and return path.

26. The apparatus of claim 25, wherein the forced-air current is discharged from the discharge port at the front of the cargo chamber, said guide means including a set of floor channels within the floor of said cargo chamber.

27. The apparatus of claim 25, wherein the forced-air current is discharged from the discharge port at the front of the cargo chamber, said guide means including a backside wall.

28. The apparatus of claim 27, wherein the backside wall comprises a cargo door or pair of cargo doors.

29. The apparatus of claim 25, wherein said cargo chamber is a top flow cargo chamber such that the guide means comprise:

a ceiling for guiding the forced-air current from the frontside discharge port toward a backside wall;

the backside wall for guiding the forced-air current from the ceiling toward one or more floor channels; and the one or more floor channels for guiding the forced-air current from the backside wall toward the frontside return port.

30. The apparatus of claim 25, wherein said cargo chamber is a bottom flow cargo chamber such that the guide means comprise:

one or more floor channels for guiding the forced-air current from the frontside discharge port toward a backside wall;

the backside wall for guiding the forced-air current from the floor channels toward a ceiling; and the ceiling for guiding the forced-air current from the backside wall toward the frontside return port.

31. The apparatus of claim 18, further comprising an endothermic storage material fixedly retained within each of said plurality of thermal storage ducts.

32. The apparatus of claim 31, wherein said endothermic storage material is a thermally chargeable gel having endothermic and exothermic thermal exchange properties.

33. The apparatus of claim 31, wherein the endothermic storage material is a thermally chargeable phase change material.

* * * * *